United States Patent [19]

Cirineo

[11] Patent Number: 5,450,136
[45] Date of Patent: Sep. 12, 1995

[54] DECODER CIRCUIT FOR GENERATING A SYSTEM CLOCK SIGNAL PHASE LOCKED TO A RANGE TONE SIGNAL

[75] Inventor: Anthony Cirineo, Ventura, Calif.

[73] Assignee: The United States of America as represented by the Secretary of the Navy, Washington, D.C.

[21] Appl. No.: 242,399

[22] Filed: May 13, 1994

[51] Int. Cl.[6] .................. H04N 17/00; H04N 9/45
[52] U.S. Cl. .................. 348/500; 348/507; 348/537; 375/376
[58] Field of Search .......... 348/537, 507; 375/120, 375/376, 327; 331/1 R, 25; H04N 17/00, 9/45, 9/455

[56] References Cited

U.S. PATENT DOCUMENTS

| | | | |
|---|---|---|---|
| 4,118,738 | 10/1978 | Arnstein | 358/148 |
| 4,584,695 | 4/1986 | Wong et al. | 375/81 |
| 4,713,841 | 12/1987 | Porter et al. | 455/808 |
| 4,837,781 | 6/1989 | Hickling | 375/81 |
| 4,853,943 | 8/1989 | Laws | 375/87 |
| 5,235,422 | 8/1993 | Ido et al. | 358/158 |

OTHER PUBLICATIONS

Excerpts from Navair 16-30DKW3A-1 Maintanence Manual, pp. 2, 5, 6, 16, 25 and 26 and Figs. 4, 6 and 8.

*Primary Examiner*—James J. Groody
*Assistant Examiner*—Nina N. West
*Attorney, Agent, or Firm*—David S. Kalmbaugh; Melvin J. Sliwka

[57] ABSTRACT

A decoder circuit for receiving a video input signal which includes Manchester coded data bits and a range tone component having a frequency of about 102.6 kilohertz. A phase lock loop circuit detects the presence of the 102.6 kilohertz range tone component and then generates a system clock signal which is phase locked to the range tone component of the video input signal. The system clock signal is provided to a clock generating circuit which generates a clock signal having four phases. The phase lock loop circuit also provides a logic signal which is supplied to a data detecting circuit allowing the data detecting circuit to convert the Manchester coded data bits to digital data bits.

14 Claims, 6 Drawing Sheets

DECODER CIRCUIT FOR GENERATING A SYSTEM CLOCK SIGNAL PHASE LOCKED TO A RANGE TONE SIGNAL

BACKGROUND OF THE INVENTION

1. Field of the Invention

The present invention relates generally to a circuit for generating a system clock signal. More specifically, the present invention relates to a digital decoder circuit for receiving an input digital signal which includes data and a range tone signal and then providing a clock signal which is phase locked to the range tone signal.

2. Description of the Prior Art

Targets are used by the military services to allow military aircraft, ships and other weapons systems to practice in a real life environment without risking injury to human or the loss of expensive and sophisticated equipment. Each target, in turn, includes a target transponder receiver for receiving and processing video data which controls the movement of the target based upon the information provided by a ground station, an ocean going vessel or the like.

One particular type of target transponder receiver is a Model No. AN/DKW3 Target Transponder Receiver used in military targets. The AN/DKW3 Target Transponder Receiver includes a decoder subassembly/module which receives a video input signal having Manchester coded data bits and a range tone component having a frequency of about 102.6 kilohertz. The decoder subassembly upon receiving the video input signal processes the video input signal converting the Manchester coded data bits to digital data. The decoder subassembly also provides a system clock signal phase locked to the range tone component of the video input signal as well as a synchronized four phase clock signal which is used by the AN/DKW3 Target Transponder Receiver to further process the received information.

The decoder subassembly (illustrated in FIG. 1 as a block diagram) presently used in the AN/DKW3 Target Transponder Receiver is complex in design having numerous electronic components which are susceptible to failure and therefore expensive to repair or replace.

With these and other disadvantages of the prior art decoder circuit, the present invention was conceived and one of its objects is to provide a relatively simple yet highly efficient electronics decoder circuit which will phase-lock to the range tone component of the video input signal to generate a system clock signal.

It is another object of the present invention to provide a logic signal which indicates the presence of the range tone component of the video input signal.

Various other advantages and objectives of the present invention will become apparent to those skilled in the art as a more detailed description of the present invention is set forth below.

SUMMARY OF THE INVENTION

The aforesaid and other objects of the present invention are accomplished by an electronics decoder circuit which receives a video input signal having Manchester coded data bits and a range tone component having a frequency of about 102.6 kilohertz, A phase lock loop circuit detects the presence of the 102.6 kilohertz range tone component and then generates a system clock signal which is phase locked to the range tone component of the video input signal, The system clock signal is provided to a clock generating circuit which generates a clock signal having four phases, The phase lock loop circuit also provides a logic signal which is supplied to a data detecting circuit allowing the data detecting circuit to convert the Manchester coded data bits to digital data bits.

DETAILED DESCRIPTION OF THE PREFERRED EMBODIMENT

Figure 1:
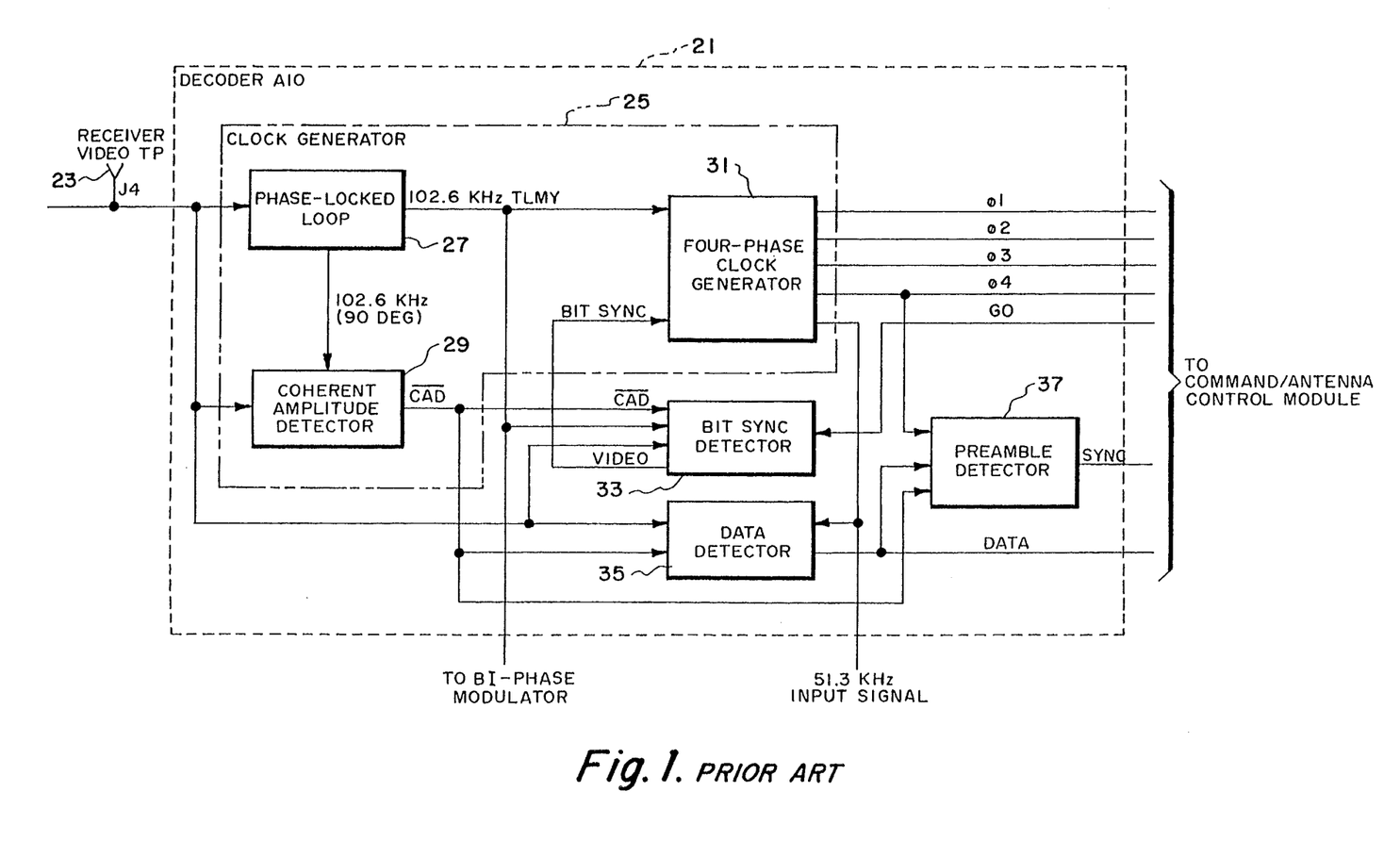
FIG. 1 is a block diagram illustrating the prior art decoder circuit used to generate a system clock signal which is phased locked to a range tone signal.
Figure 3:
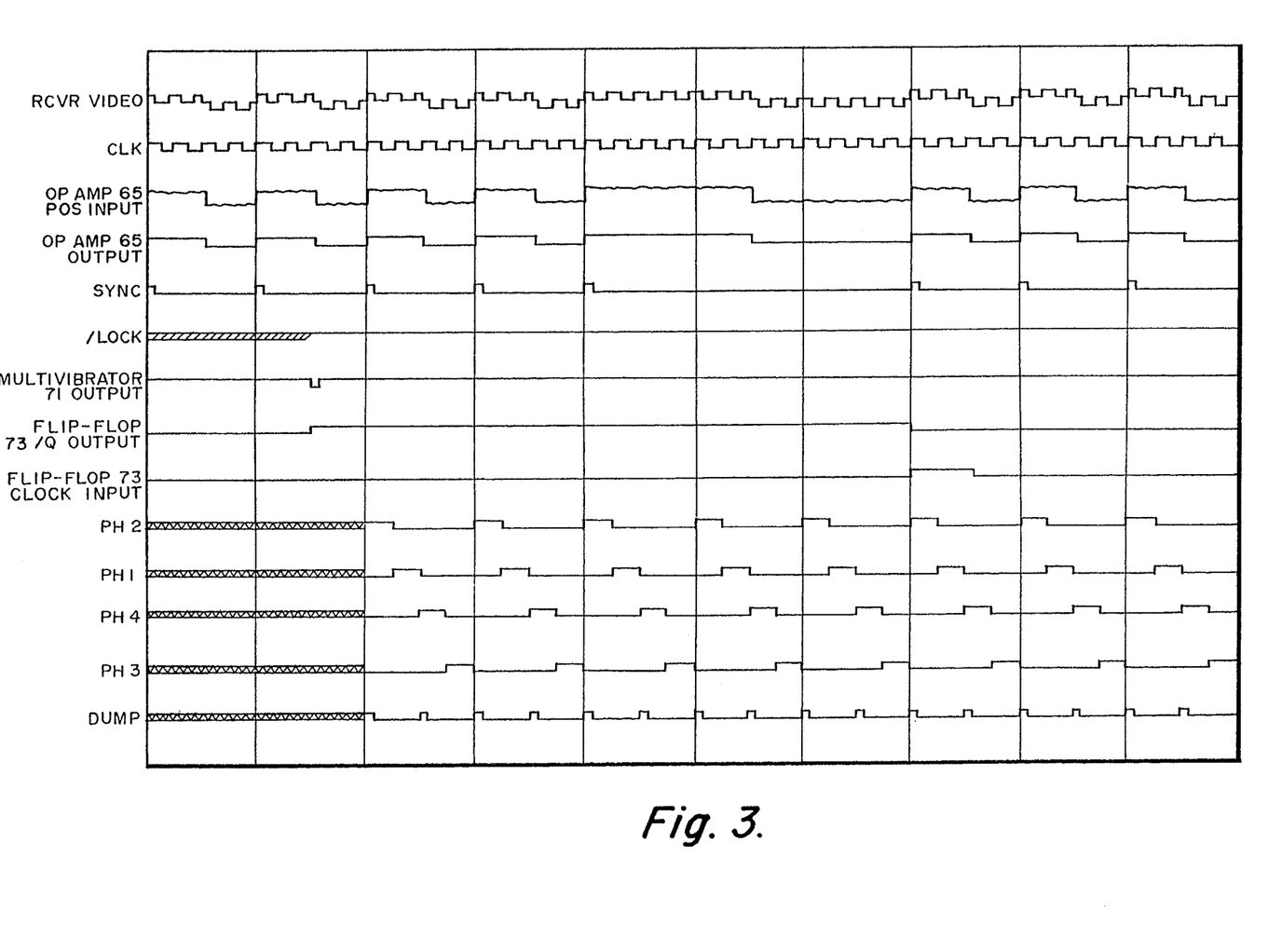
FIG. 3 is a timing diagram illustrating the digital input signal provided to the decoder circuit of FIG. 2 and the clock signal and other timing waveforms occurring at the outputs of the decoder circuit of FIG. 2.

Referring to FIG. 1, there is shown a block diagram of the prior art decoder circuit, designated generally by the reference numeral 21, which has an input terminal 23 for receiving a video input signal (RCVR VIDEO of FIG. 3). The video input signal of FIG. 3 includes Manchester coded data bits and a range tone component having a frequency of 102.6 kilohertz. The decoder circuit 21 includes a clock generator circuit 25 consisting of a phase lock loop circuit 27, a coherent amplifier detector 29 and a four phase clock generator 31. System clock signals are, in turn, derived from outputs of the phase lock loop circuit 27.

Phase lock loop circuit 27 locks in phase to the 102.6 kilohertz range tone component of the video input signal of FIG. 3 generating two 102.6 kilohertz signals. The first signal of the two 102.6 kilohertz signals is supplied from decoder circuit 21 to a digital telemetry/modulator (not illustrated) to develop bi-phase modulation. This first 102.6 kilohertz signal is also supplied to four-phase clock generator 31 to clock four phase clock generator 31 and a bit sync detector 33.

When phase lock loop circuit 27 is locked to the 102.6 kilohertz component in the video signal, the second 102.6 kilohertz output signal is supplied to coherent amplifier detector 29. Coherent amplifier detector 29 is responsive to this 102.6 kilohertz signal and the received video signal by indicating a locked condition. Coherent amplifier detector 29 then generates a logic signal which enables bit sync detector 33, a data detector 35 and a preamble detector 37. Until a lock is detected the coherent amplitude detector logic signal generated by coherent amplitude detector 29 functions to inhibit the operation of bit sync detector 33, data detector 35 and preamble detector 37. When bit sync detector 33 is enabled bit sync detector 33 generates a bit sync signal, having a frequency of 25.65 kilohertz, which is used for synchronization of four phase clock generator 31.

The four phase clock generator provides four clock phases PH1, PH2, PH3 and PH4 which are illustrated in FIG. 3. The four clock phases are provided at a bit rate of 25.65 kilohertz to sequentially process received data on a command/antenna control module (not illustrated) and a command memory module (not illustrated). Two of the four clock phases are combined to generate a 51.3 kilohertz clock signal which is supplied to data detector 35 to clock data detector 35 and is supplied to an encoder module (not illustrated) and digital telemetry/modulator.

The received video input signal is provided to data detector 35 which consist essentially of a matched filter that detects Manchester coded data bits. The digital data output is then supplied to preamble detector 37 which checks for a predetermined digital data bit pattern and upon sensing the bit pattern provides sync pulses which are supplied to a command/antenna control module (not illustrated).

Referring to FIGS. 2a, 2b, 2c, 2d and 2e, there is shown a decoder circuit, designated generally by the reference numeral 41, which replaces the previously utilized decoder circuit 21 illustrated in FIG. 1. The decoder circuit 41 constituting the present invention includes a data input terminal 43 for receiving a video input signal (illustrated in FIG. 3 and identified as RCVR VIDEO) which includes Manchester coded data bits and a range tone component having a frequency of 102.6 kilohertz. The video input signal of FIG. 3 next passes through a buffer 44 having a gain of one to a voltage divider circuit 45 comprising a pair of resistor R18 and R11 which reduces the amplitude of the video input signal to an amplitude of about 0.06 the amplitude of the video input signal. The reduced amplitude video input signal is next provided to the input of a tone decoder/phase-locked loop circuit 47 through a capacitor C11. Capacitor C11 blocks any DC voltage to the phase-locked loop circuit 47 which may be present in the video input signal of FIG. 3.

Phase-locked loop circuit 47, in turn, generates a triangular shaped signal which is phased locked to the 102.6 kilohertz range tone component of the video input signal. The following equations are used to determine the approximate values of resistors R13 and R14 and capacitor C14 when it is required that the signal generated by phase lock loop circuit 47 be phase-locked to the range tone component of the input signal.

$$f_c = \frac{1}{1.1 R_1 C_1} \quad (1)$$

where $f_c$ is the center frequency of $102.6 \cdot 10^3$ hertz. BW is $$BW = 1070 \sqrt{\frac{V_1}{f_c C_2}} \quad (2)$$

the detection bandwidth which is a frequency range, centered about $f_c$, with an input signal above a threshold voltage $V_1$ which will cause a logic zero to occur at the output of phase-locked loop circuit 47. $V_1$ is generally less than or equal to 200 mV$_{RMS}$.

Figure 2A:
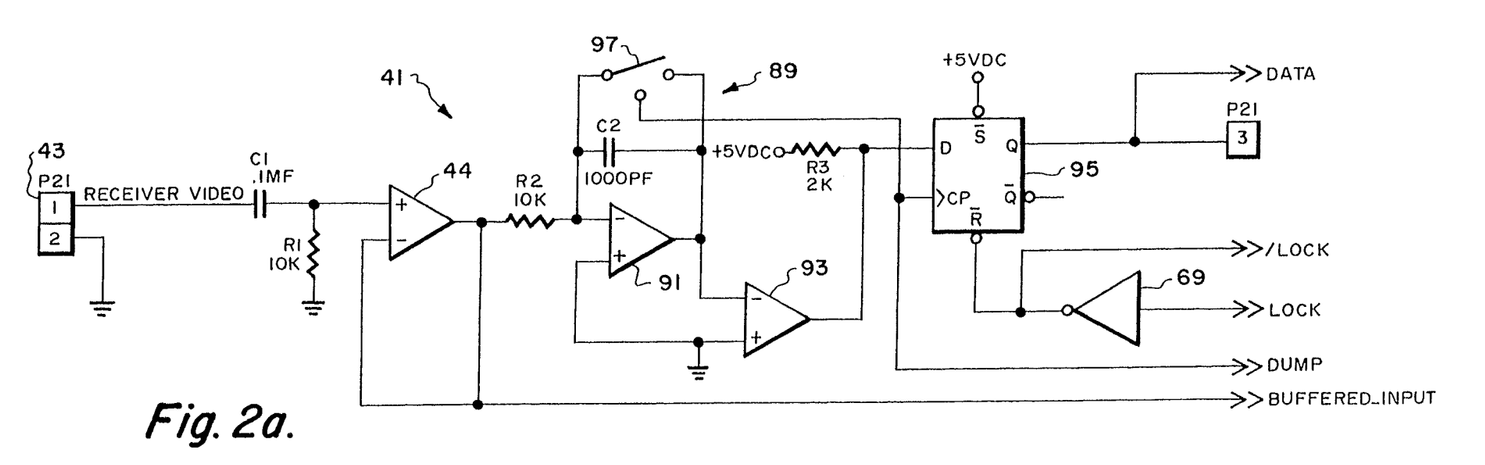
FIGS. 2a through 2e is an electrical circuit diagram of the decoder circuit of the present invention.
Figure 2B:
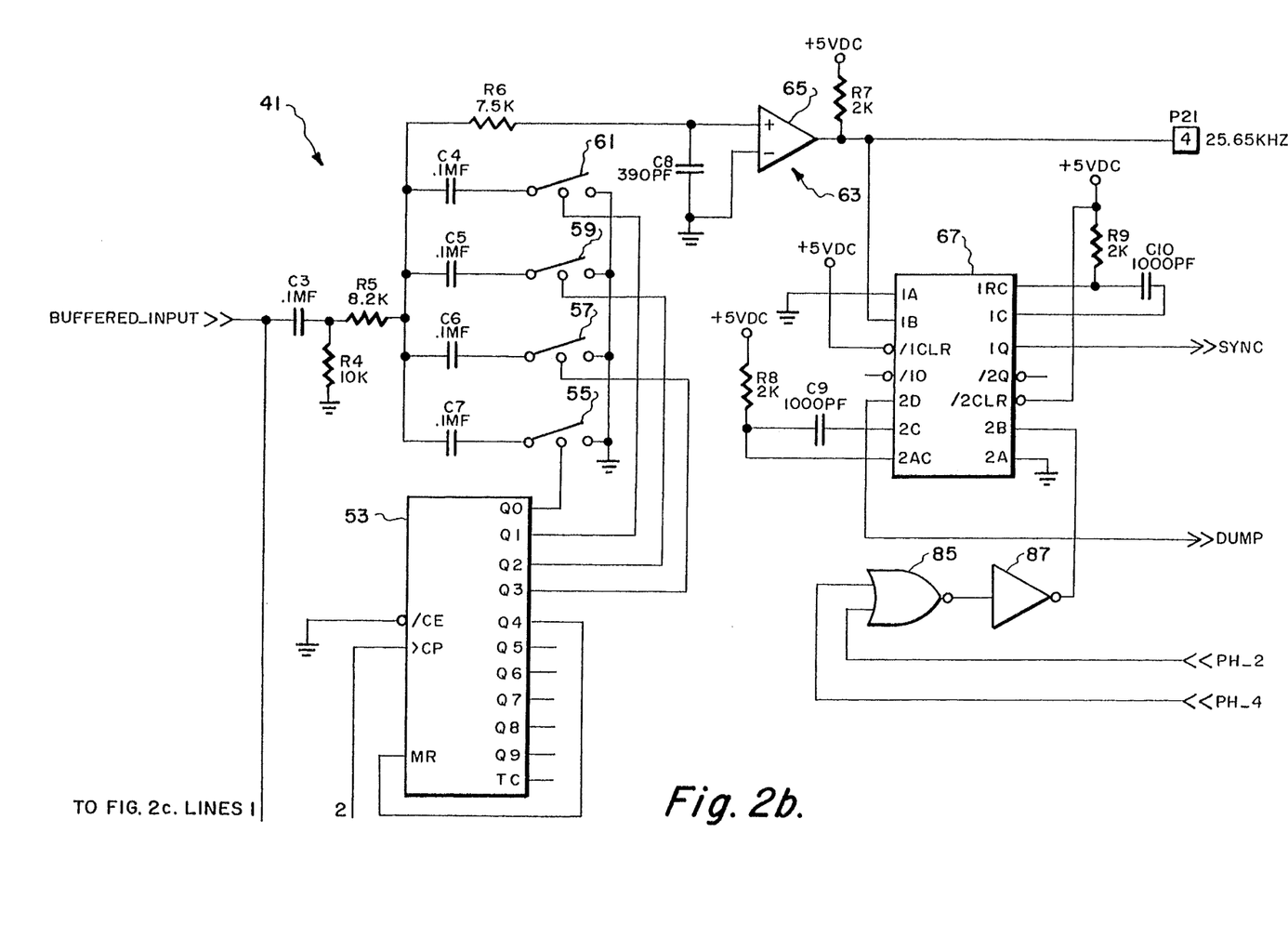
Figure 2C:
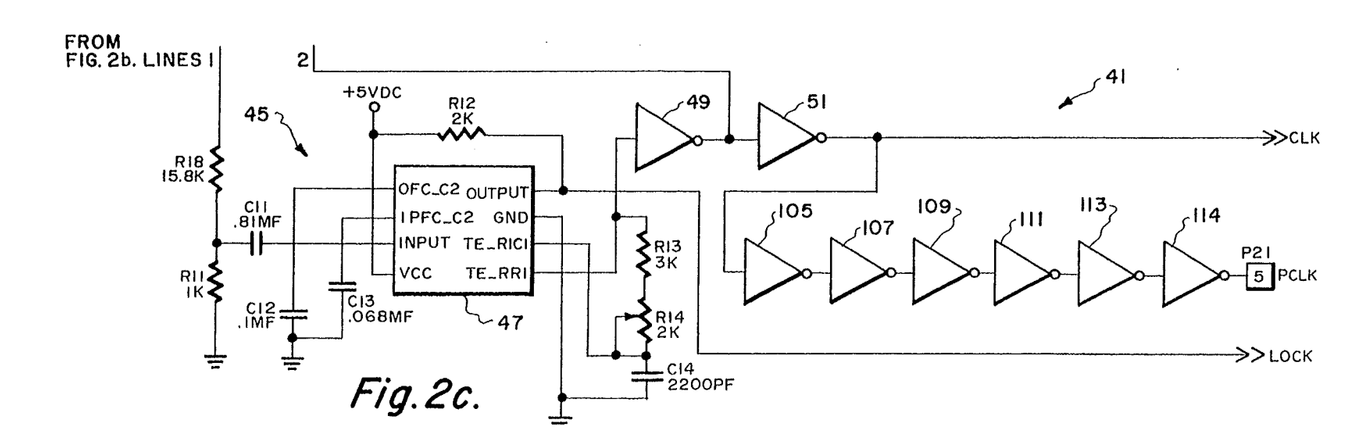
Figure 2D:
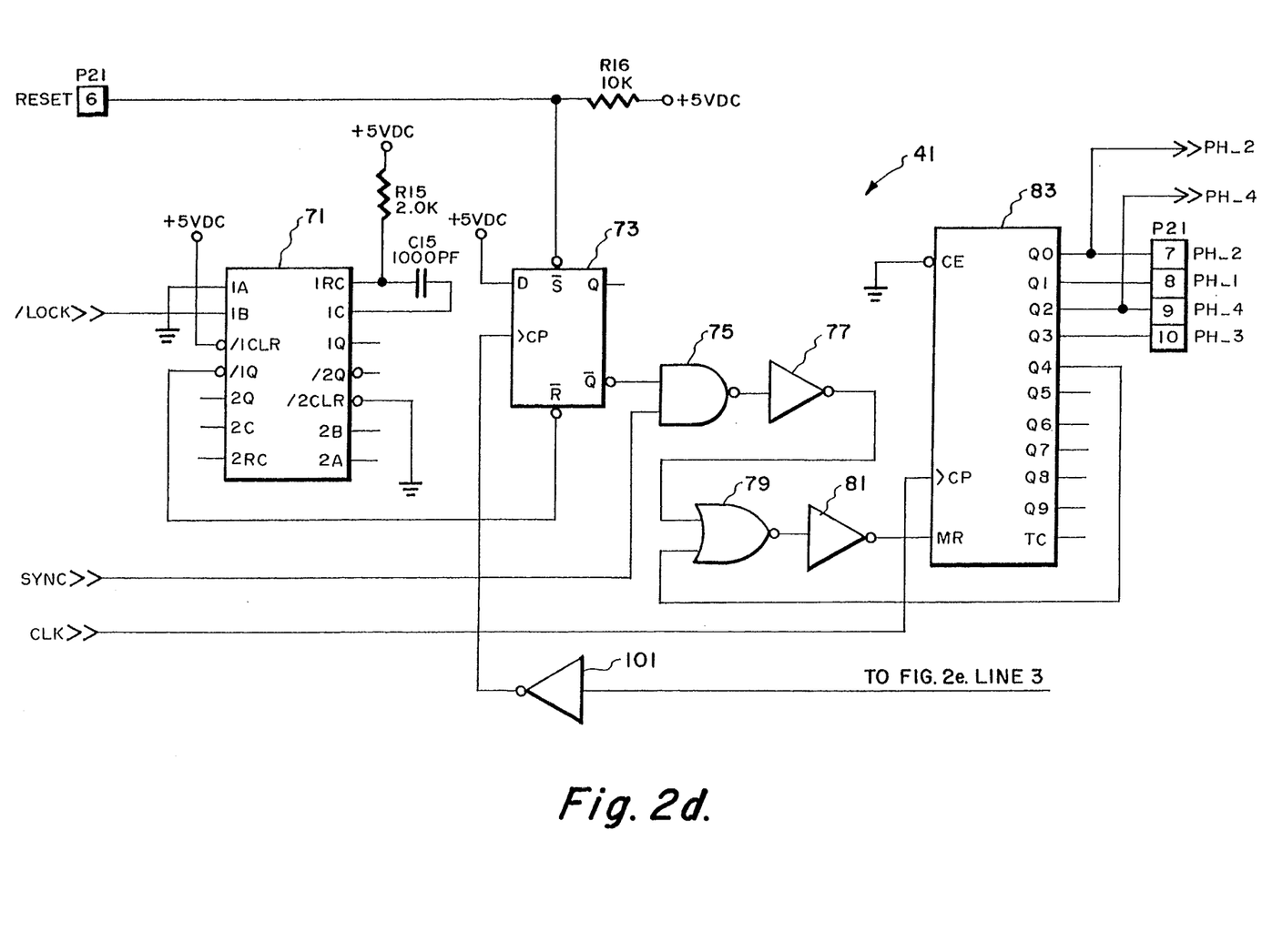
Figure 2E:
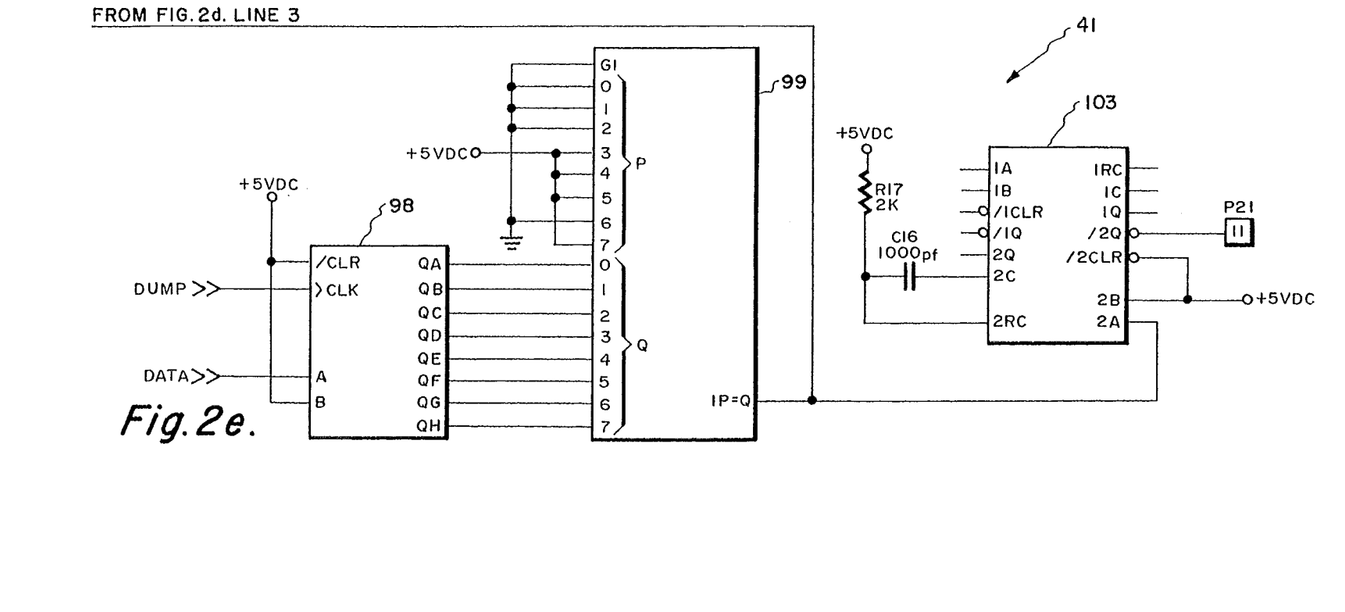

In the preferred embodiment, the value selected for $V_1$ is $150 \times 10^{-3}$ Volts RMS, $C_1$ is selected to be $2200 \times 10^{-12}$ farads and $f_c$ is $102.6 \cdot 10^3$ hertz. $R_1$ is calculated as having a value of $4.028 \times 10^3$ ohms by using equation (1). When the bandwidth is selected to have a value of five the value calculated for $C_2$ using equation (2) is 0.067 microfarads. As illustrated in FIG. 2c capacitor C14 is $C_1$ in equation (1) and has a value of 2200 picofarads; the combination of fixed resistor R13 and variable resistor R14 is resistor $R_1$ with resistor R14 being varied until the combination of R13 and R14 has a value of about 4.028 kil-ohms; capacitor C13 is $C_2$ in equation (2) and has a value a value of 0.068 microfarads and capacitor C12 is selected to have a value approximately twice the value of capacitor C2 of equation (2) which is 0.1 microfarads. R12 is set at 2 kilohms.

For the preferred embodiment of the present invention the Tone Decoder used was a Model NE/SE567 Tone Decoder manufactured by Signetics Corporation of Sunnyvale, Calif. At this time, it should be noted that the ninety degrees phase shift is a function of the internal circuitry the Signetics Model NE/SE567 Tone Decoder.

When the 102.6 kilohertz range tone component of the video signal of FIG. 3 is present at the input of phase lock loop circuit 47, the output of phase lock loop circuit 47 will transition to the logic zero state and the timing element R1 (TE_RR1) output will provide a 102.6 kilohertz triangular wave output signal which is phase shifted ninety degrees from the range tone component of the video input signal of FIG. 3.

The 102.6 kilohertz triangular wave output signal from the output of phase lock loop circuit 47 is supplied to an inverter 49 which inverts the 102.6 kilohertz triangular shaped signal and also shapes the signal into a square wave. The inverted 102.6 square wave signal (illustrated in FIG. 4) is then supplied to the clock input of Johnson/decade counter 53. The 102.6 kilohertz triangular wave output signal is also supplied to six series connected Hex Schmitt Trigger inverters 105, 107, 109, 111, 113 and 114 which buffer and delay the signal providing at the output of inverter 114 the system clock signal to the digital telemetry/modulator (not illustrated).

Figure 4:
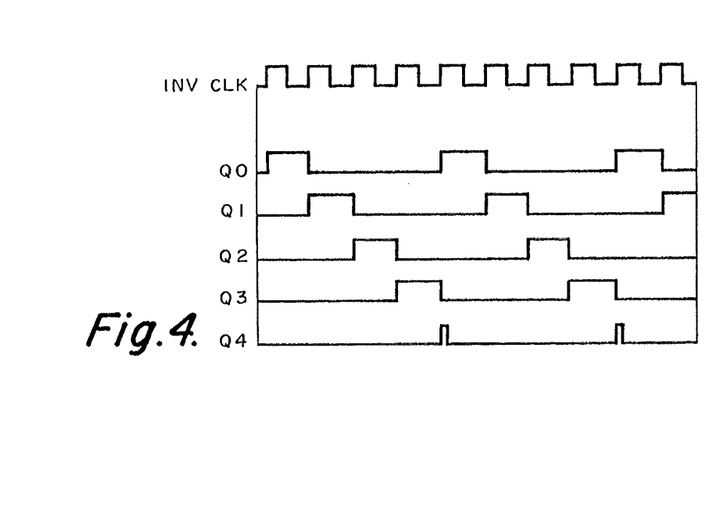
FIG. 4 illustrates the timing waveforms provided by a Johnson counter within the decoder circuit of FIG. 2.

Johnson/decade counter 53, in response to the inverted 102.6 kilohertz signal, first provides a logic one pulse at its Q0 output, FIG. 4, followed by successive logic one pulses at its Q1, Q2, Q3 and Q4 outputs as shown in FIG. 4. The logic one pulse occurring at the Q4 output of Johnson counter 53 is provided to the MR input (reset) of Johnson counter 53 to asynchronously clear counter 53 and set the Q0 output high as shown in FIG. 4.

The inverted 102.6 square wave signal is also supplied to an inverter 51 which inverts the signal providing at its output the 102.6 kilohertz system clock signal illustrated in FIG. 3 and identified as CLK.

The Q0 output of counter 53 is connected to a solid state switch 55 closing switch 44 when the Q0 output of counter 53 is at the logic one state. In a like manner, solid state switch 57 closes when the Q1 output of counter 53 transitions to the logic one state, solid state switch 59 closes when the Q2 output of counter 53 transitions to the logic one state and solid state switch 61 closes when the Q 3 output of counter 53 transitions to the logic one state.

The closure of switch 55, in turn, charges a capacitor C7, the closure of switch 57 charges a capacitor C6, the closure of switch 59 charges a capacitor C5 and the closure of switch 61 charges a capacitor C4. Providing the video data signal of FIG. 3 to capacitors C4, C5, C6 and C7 results in the generation of an approximately square wave signal having a positive portion and a negative portion. It should be noted that whenever any of the solid state switches 55, 57, 59 or 61 are open the capacitors C4, C5, C6 or C7 connected to the open switch will not discharge. Thus, the charge on capacitors C4, C5, C6 and C7 will build until the capacitors are fully charged.

The signal provided by capacitors C4, C5, C6 and C7 is next supplied to a voltage limiter circuit 63 (identified in FIG. 3 as being the signal occurring at the positive input of an operational amplifier 65). Voltage limiter circuit 63, which includes operational amplifier 65, eliminates the negative going portion of the signal. Resistor R7 which is connected to +5VDC insures the positive going portion of the signal is about +5VDC. The signal occurring at the output of amplifier 65, FIG. 3, has a frequency of about 25.6 kilohertz and is supplied to the 1B input of a monostable multivibrator 67. The logic zero to one transition of this 25.6 kilohertz signal triggers monostable multivibrator 67 causing monostable multivibrator 67 to provide at its Q output a SYNC pulse, FIG. 3, for each logic zero to one transition of the 25.6 kilohertz signal.

The output of phase lock loop circuit 47 transitions to a logic zero state when the phase lock loop circuit 47 detects the presence of the range tone component of the video signal of FIG. 3. The logic zero signal occurring at the output of circuit 47 is supplied to an inverter 69 which inverts the signal resulting in a logic one transition (identified as/LOCK of FIG. 3) being provided to the 1B input of a monostable multivibrator 71. Monostable multivibrator 71 next provides a negative going pulse (illustrated in FIG. 3) at its not 1Q output which is supplied to the reset input of a Flip-Flop 73 resetting the not Q output of Flip-Flop 73 to the logic one state as shown in FIG. 3.

When Flip-Flop 73 is reset the logic one state occurring at the not Q output of Flip-Flop 73 is supplied to the first input of a NAND gate 75 enabling NAND gate 75. After NAND gate 75 is enabled, the SYNC signal of FIG. 3 when supplied to the second input of NAND gate 75 will be inverted by NAND gate 75 and then supplied to inverter 77 which again inverts the SYNC signal of FIG. 3. The SYNC signal of FIG. 3 is next supplied to the first input of a NOR gate 79.

The 102.6 kilohertz system clock signal of FIG. 3 is provided to the clock input of a Johnson/decade counter 83 to clock counter 83. Johnson/decade counter 83, responsive to the system clock signal of FIG. 3, provides at its Q0, Q1, Q2 and Q3 outputs respectively the PH2, PH1, PH4, and PH3 clock signal illustrated in FIG. 3 which are supplied to the Command/Antenna Control module (not illustrated). When the Q4 output of Johnson/decade counter 83 transitions to the logic one state as shown in FIG. 4 a logic one pulse is supplied to the second input of a NOR gate 79.

Either a pulse of the SYNC signal of FIG. 3 or the logic one pulse (FIG. 4) occurring at the Q4 output of Johnson/decade counter 83 may reset counter 83 allowing counter 83 to repeat sequential generation of the PH2, PH1, PH4, and PH3 clock pulses of FIG. 3. For example, when the SYNC pulse of FIG. 3 remains at the logic zero state and the Q4 output of Johnson/decade counter 83 provides a logic one pulse, a logic zero pulse will occur at the output of NOR gate 79 which is inverted by inverter 81 resulting in a logic one pulse being provided to the reset input of counter 83.

At this time it should be noted that Johnson/decade counters 53 and 83 operate in exactly the same manner and thus the timing waveforms illustrated in FIG. 4 may be used to describe the operation of each counter 53 and 83. It should also be noted that a Model SN54HC4017 Decade Counter manufactured by Texas Instruments of Dallas Texas may be used as Johnson/decade counters 53 and 83.

The PH2 and PH4 clock signals are supplied respectively to the first and second inputs of a NOR gate 85. The transition of the PH2 clock signal of FIG. 3 from a logic zero state to a logic one state will result in a logic one to zero transition at the output NOR gate 85 which is inverted by inverter 87 resulting in a logic zero to one transition occurring at the 2B input of monostable multivibrator 67. This logic zero to one transition triggers multivibrator 67 which generates a first positive going pulse at its 2Q output. In a like manner, the transition of the PH4 clock signal of FIG. 3 from a logic zero state to a logic one state will result in a logic zero to one transition occurring at the 2B input of monostable multivibrator 67 triggering multivibrator 67 which then generates a second positive going pulse at its 2Q output. The pulses of PH2 and PH4 clock signals of FIG. 4 will continue to trigger multivibrator 67 causing multivibrator 67 to continue generating the positive going pulses of the DUMP signal of FIG. 3. It should be noted that the frequency of the DUMP signal of FIG. 3 is about 51.3 kilohertz.

The video input signal of FIG. 3 is also supplied to an integrator 89 comprising a resistor R2, a capacitor C2 and an operational amplifier 91. Integrator 89 integrates the video input signal of FIG. 3 providing a logic one or a logic zero at the D input of Flip-Flop 95. Resistor R3 which is connected to +5VDC insures that whenever the integrated signal provided by integrator 89 is representative of a logic one the signal will have a voltage of about +5VDC. Similarly, whenever the integrated signal provided by integrator 89 is representative of a logic zero amplifier 93 will insure a signal of zero volts is provided to the D input of Flip-flop 95. The pulses of the DUMP signal clock the logic ones and zeros occurring at the D input of Flip-Flop 95 to its Q output. These logic ones and zeros represent the digital data bits decoded from the Manchester coded data bits of the video input signal of FIG. 3. These digital data bits are then supplied to the Command/Antenna Control module (not illustrated) for processing.

It should be that the pulses of the DUMP signal of FIG. 3 also close a solid state switch 97 which clears integrator 89. It should also be noted that Flip-Flop 95 is reset by the/LOCK signal of FIG. 3 when the/LOCK signal is at the logic zero state.

There is provided from Flip-Flop 95 to a serial-in parallel-out shift register 98 a unique 10111000 bit pattern which is converted to a parallel format by shift register 98 resulting in a bit pattern of 10111000 at the Q7 through Q0 inputs of an 8 bit comparator 99. Since the logic bits provided to the P7, P6, P5, P4, P3, P2, P1 and P0 inputs are set at respectively 10111000 the output of comparator 99 will generate a negative pulse which is inverted by inverter 101 to a positive pulse. This pulse (illustrated in FIG. 3) is then supplied to the clock input of Flip-Flop 73 clocking the logic one at the D input of Flip-Flop 73 to its Q output. As is best illustrated in FIG. 3, the not Q output of Flip-Flop 73 will also transition to the logic zero state.

When the not Q output of Flip-Flop 73 transitions of the logic zero state, the output of NAND gate 75 will remain at the logic one state resulting a logic zero at the output of inverter 77. The pulse occurring at the Q4 output of Johnson/decade counter 83, FIG. 4, then resets counter 83. It should be noted that when the pulses occurring at the Q4 output of counter 83 are resetting counter 83, counter 83 is synchronized to the range tone component of the incoming video signal.

The negative pulse occurring at the 1P=Q output of comparator 99 is also supplied to the 2A input of a multivibrator 103 which in response to this pulse generates a sync pulse at its not 2Q output.

It should be noted that shift register 98 is a Texas Instrument Model SN54HC164 8-Bit Parallel-Out Serial Shift Register, comparator 99 is a Texas Instrument Model SN54HC688 8-Bit Identity Comparator and multivibrators 67, 71 and 103 are Texas Instrument Model SN54HC423A Retriggerable Monostable Multivibrators.

From the foregoing, it may readily be seen that the present invention comprises a new, unique and exceedingly useful decoder circuit for locking in-phase to a range tone signal to provide a coherent clock signal which is considerable improvement over the known prior art. Obviously many modifications and variations of the present invention are possible in light of the above teachings. It is therefore to that within the of the appended claims the invention may be practiced otherwise than as specifically described.

What is claimed is:

1. An electronics circuit for detecting a range tone component of an incoming video signal, said incoming video signal comprising said range tone component and Manchester coded data bits, said range tone component having a predetermined frequency, said electronics circuit comprising:

an input terminal for receiving said incoming video signal;

a phase lock loop circuit connected to said input terminal for receiving said incoming video signal from said input terminal and for detecting the presence of the range tone component of said incoming video signal;

said phase lock loop circuit providing a system clock signal, an inverted system clock signal and a lock signal whenever said phase lock loop circuit detects the presence of the range tone component of said incoming video signal, said system clock signal having a first frequency identical to the predetermined frequency of said range tone component, said system clock signal being locked in phase to said range tone component;

divider circuit means connected to said phase lock loop circuit and said input terminal for receiving said inverted system clock signal and said range tone component, said divider circuit means responsive said inverted system clock signal and said range tone component providing a first clock signal having a second frequency that is about one fourth the predetermined frequency of said range tone component;

a first monostable multivibrator connected to said divider circuit means for receiving said first clock signal and then providing a sync signal having a plurality of sync pulses;

a multiphase clock signal generating circuit connected to said phase lock loop circuit and said first monostable multivibrator for receiving said system clock signal, said lock signal and said sync signal;

said lock signal enabling said multiphase clock signal generating circuit allowing said multiphase clock signal generating circuit to divide said system clock signal by four to provide a phase one clock signal, a phase two clock signal, a phase three clock signal, a phase four clock signal and a phase five clock signal, each of said phase one, phase two, phase three, phase four and phase five clock signals having a third frequency that is about one fourth the first frequency of said system clock signal, the sync pulses of said sync signal clearing said multiphase clock signal generating circuit;

gating circuit means connected to said multiphase clock signal generating circuit and said first monostable multivibrator for combining said phase two clock signal and said phase four clock signal to provide a second clock signal having a fourth frequency that is twice the third frequency of said phase two and said phase four clock signals;

said first monostable multivibrator receiving said second clock signal and then providing a dump signal having a plurality of dump pulses;

integrating circuit means connected to said input terminal, said phase lock loop circuit and said first monostable multivibrator, said lock signal enabling said integrating circuit means allowing said integrating circuit means to convert said Manchester coded data bits into equivalent digital data bits, the dump pulses of said dump signal clocking said equivalent digital data bits from said integrating circuiting means; and comparison means connected to said integrating circuit means, said first monostable multivibrator and said multiphase clock signal generating circuit for receiving said equivalent digital data bits from said integrating circuit means and comparing said equivalent digital data bits with a preselected eight bit word, said comparison means generating a negative pulse whenever eight of said equivalent digital data bits are equivalent to said preselected eight bit word;

said comparison means supplying said negative pulse to said multiphase clock signal generating circuit preventing the sync pulses of said of said sync signal from clearing said four phase clock signal generating circuit allowing said phase five clock signal to clear said comparison means.

2. The electronics circuit of claim 1 wherein said gating circuit means comprises:

a NOR gate having a first input for receiving said phase two clock signal, a second input for receiving said phase four clock signal and an output; and an inverter having an input connected to the output of said NOR gate and an output connected to said first monostable multivibrator.

3. The electronics circuit of claim 1 wherein said multi-phase clock signal generating means comprises:

a second monostable multivibrator having an input for receiving said lock signal and an output;

a first inverter having an input for receiving said negative pulse and an output;

a Flip-Flop having a reset input connected to the output of said second monostable multivibrator, a data input for receiving a logic one signal, a clock input connected to the output of said first inverter and an output;

a NAND gate having a first input for receiving said sync signal, a second input for receiving said sync signal and an output;

a second inverter having an input connected to the output of said NAND gate and an output;

a NOR gate having a first input connected to the output of said second inverter, a second input and an output;

a third inverter having an input connected to the output of said NOR gate and an output; and a decade counter having a clock input for receiving said system clock signal, a reset input connected to the output of said third inverter, a Q0 output for providing said phase two clock signal, a Q1 output for providing said phase one clock signal, a Q2 output for providing said phase four clock signal, a Q3 output for providing said phase three clock signal and a Q4 output connected to the second input of said NOR gate.

4. The electronics circuit of claim 1 wherein said integrating circuit means comprises:

a first resistor having a first terminal for receiving said incoming video signal and a second terminal;

a first operational amplifier having a negative input connected to the second terminal of said resistor, a positive input connected to ground and an output;

a capacitor having a first terminal connected to the negative input of said first operational amplifier, and a second terminal connected to the output of said first operational amplifier;

a second operational amplifier having a negative input connected to the output of said first operational amplifier, a positive input connected to ground and an output;

a five volt source having an output;

a second resistor having a first terminal connected to the output of said five volt source and a second terminal connected to the output of said second operational amplifier;

a D Flip-Flop having a data input connected to the output of said second operational amplifier, a clock input for receiving said dump signal, a reset input for receiving said lock signal and an output for providing said equivalent digital data bits; and a solid state switch having a first terminal for receiving the dump pulses of said dump signal, a second terminal connected to the negative input of said first operational amplifier and a third terminal connected to the output of said first operational amplifier.

5. The electronics circuit of claim 1 wherein said comparison means comprises:

a serial-in parallel-out shift register having a clock input for receiving the dump pulses of said dump signal, a data input for receiving said equivalent digital data bits and eight data outputs; and an eight bit comparator having eight data inputs, eight comparison inputs and an output, each of said eight data inputs of said eight bit comparator being connected to one of said eight data outputs of said serial-in parallel-out shift register, the eight comparison inputs of said eight bit comparator receiving said preselected eight bit word and the output of said eight bit comparator providing said negative pulse.

6. The electronics circuit of claim 1 wherein said divider circuit means comprises:

a decade counter having a clock input for receiving said inverted system clock signal, a reset input, a Q0 output, a Q1 output, a Q2 output, a Q3 output and a Q4 output connected to the reset input of said decade counter;

a first solid state switch having a first terminal connected to the Q0 of said decade counter, a second terminal connected to ground and a third terminal;

a second solid state switch having a first terminal connected to the Q1 of said decade counter, a second terminal connected to ground and a third terminal;

a third solid state switch having a first terminal connected to the Q2 of said decade counter, a second terminal connected to ground and a third terminal;

a fourth solid state switch having a first terminal connected to the Q3 of said decade counter, a second terminal connected to ground and a third terminal;

a first capacitor having a first terminal connected to the third terminal of said first solid state switch and a second terminal for receiving said incoming video signal;

a second capacitor having a first terminal connected to the third terminal of said second solid state switch and a second terminal for receiving said incoming video signal;

a third capacitor having a first terminal connected to the third terminal of said third solid state switch and a second terminal for receiving said incoming video signal;

a fourth capacitor having a first terminal connected to the third terminal of said fourth solid state switch and a second terminal for receiving said incoming video signal;

an operational amplifier having a positive input connected to the second terminals of said first, second, third and fourth capacitors and an output connected to said first monostable multivibrator;

a five volt source having an output; and a resistor having a first terminal connected to the output of said five volt source and a second terminal connected to the output of said operational amplifier.

7. An electronics circuit for detecting a range tone component of an incoming video signal, said incoming video signal comprising said range tone component and Manchester coded data bits, said range tone component having a predetermined frequency, said electronics circuit comprising:

an input terminal for receiving said incoming video signal;

a phase lock loop circuit connected to said input terminal for receiving said incoming video signal from said input terminal and for detecting the presence of the range tone component of said incoming video signal;

said phase lock loop circuit providing a system clock signal, an inverted system clock signal and a lock signal whenever said phase lock loop circuit detects the presence of the range tone component of said incoming video signal, said system clock signal having a first frequency identical to the predetermined frequency of said range tone component, said system clock signal being locked in phase to said range tone component;

divider circuit means connected to said phase lock loop circuit and said input terminal for receiving said inverted system clock signal and said range tone component, said divider circuit means responsive to said inverted system clock signal and said range tone component providing a first clock signal;

a first monostable multivibrator connected to said divider circuit means for receiving said first clock signal and then providing a sync signal having a plurality of sync pulses;

a multiphase clock signal generating circuit connected to said phase lock loop circuit and said first monostable multivibrator for receiving said system clock signal, said lock signal and said sync signal;

said lock signal enabling said multiphase clock signal generating circuit allowing said multiphase clock signal generating circuit to divide said system clock signal by four to provide a phase one clock signal, a phase two clock signal, a phase three clock signal, a phase four clock signal and a phase five clock signal, the sync pulses of said sync signal clearing said multiphase clock signal generating circuit;

gating circuit means connected to said multiphase clock signal generating circuit and said first monostable multivibrator for combining said phase two clock signal and said phase four clock signal to provide a second clock signal having a fourth frequency that is twice the third frequency of said phase two and said phase four clock signals;

said first monostable multivibrator receiving said second clock signal and then providing a dump signal having a plurality of dump pulses;

integrating circuit means connected to said input terminal, said phase lock loop circuit and said first monostable multivibrator, said lock signal enabling said integrating circuit means allowing said integrating circuit means to convert said Manchester coded data bits into equivalent digital data bits, said integrating circuit means responsive to the dump pulses of said dump signal, transferring said equivalent digital data bits from said integrating circuiting means;

comparison means connected to said integrating circuit means, said first monostable multivibrator and said multiphase clock signal generating circuit for receiving said equivalent digital data bits from said integrating circuit means and comparing said equivalent digital data bits with a preselected eight bit word, said comparison means generating a negative pulse whenever eight of said equivalent digital data bits are equivalent to said preselected eight bit word;

said comparison means supplying said negative pulse to said multiphase clock signal generating circuit preventing the sync pulses of said of said sync signal from clearing said four phase clock signal generating circuit allowing said phase five clock signal to clear said comparison means; and a second monostable multivibrator connected to said comparison means for receiving said negative pulse and then providing a positive pulse.

8. The electronics circuit of claim 7 wherein said gating circuit means comprises:

a NOR gate having a first input for receiving said phase two clock signal, a second input for receiving said phase four clock signal and an output; and an inverter having an input connected to the output of said NOR gate and an output connected to said first monostable multivibrator.

9. The electronics circuit of claim 7 wherein said multi-phase clock signal generating means comprises:

a third monostable multivibrator having an input for receiving said lock signal and an output;

a first inverter having an input for receiving said negative pulse and an output;

a Flip-Flop having a reset input connected to the output of said third monostable multivibrator, a data input for receiving a logic one signal, a clock input connected to the output of said first inverter and an output;

a NAND gate having a first input for receiving said sync signal, a second input for receiving said sync signal and an output;

a second inverter having an input connected to the output of said NAND gate and an output;

a NOR gate having a first input connected to the output of said second inverter, a second input and an output;

a third inverter having an input connected to the output of said NOR gate and an output; and a decade counter having a clock input for receiving said system clock signal, a reset input connected to the output of said third inverter, a Q0 output for providing said phase two clock signal, a Q1 output for providing said phase one clock signal, a Q2 output for providing said phase four clock signal, a Q3 output for providing said phase three clock signal and a Q4 output connected to the second input of said NOR gate.

10. The electronics circuit of claim 7 wherein said integrating circuit means comprises:

a first resistor having a first terminal for receiving said incoming video signal and a second terminal;

a first operational amplifier having a negative input connected to the second terminal of said resistor, a positive input connected to ground and an output;

a capacitor having a first terminal connected to the negative input of said first operational amplifier, and a second terminal connected to the output of said first operational amplifier;

a second operational amplifier having a negative input connected to the output of said first operational amplifier, a positive input connected to ground and an output;

a five volt source having an output;

a second resistor having a first terminal connected to the output of said five volt source and a second terminal connected to the output of said second operational amplifier;

a D Flip-Flop having a data input connected to the output of said second operational amplifier, a clock input for receiving said dump signal, a reset input for receiving said lock signal and an output for providing said equivalent digital data bits; and a solid state switch having a first terminal for receiving the dump pulses of said dump signal, a second terminal connected to the negative input of said first operational amplifier and a third terminal connected to the output of said first operational amplifier.

11. The electronics circuit of claim 7 wherein said comparison meets comprises:

a serial-in parallel-out shift register having a clock input for receiving the dump pulses of said dump signal, a data input for receiving said equivalent digital data bits and eight data outputs; and an eight bit comparator having eight data inputs, eight comparison inputs and an output, each of said eight data inputs of said eight bit comparator being connected to one of said eight data outputs of said serial-in parallel-out shift register, the eight comparison inputs of said eight bit comparator receiving said preselected eight bit word and the output of said eight bit comparator providing said negative pulse.

12. The electronics circuit of claim 7 wherein said divider circuit means comprises:
- a decade counter having a clock input for receiving said inverted system clock signal, a reset input, a Q0 output, a Q1 output, a Q2 output, a Q3 output and a Q4 output connected to the reset input of said decade counter;
- a first solid state switch having a first terminal connected to the Q0 of said decade counter, a second terminal connected to ground and a third terminal;
- a second solid state switch having a first terminal connected to the Q1 of said decade counter, a second terminal connected to ground and a third terminal;
- a third solid state switch having a first terminal connected to the Q2 of said decade counter, a second terminal connected to ground and a third terminal;
- a fourth solid state switch having a first terminal connected to the Q3 of said decade counter, a second terminal connected to ground and a third terminal;
- a first capacitor having a first terminal connected to the third terminal of said first solid state switch and a second terminal for receiving said incoming video signal;
- a second capacitor having a first terminal connected to the third terminal of said second solid state switch and a second terminal for receiving said incoming video signal;
- a third capacitor having a first terminal connected to the third terminal of said third solid state switch and a second terminal for receiving said incoming video signal;
- a fourth capacitor having a first terminal connected to the third terminal of said fourth solid state switch and a second terminal for receiving said incoming video signal;
- an operational amplifier having a positive input connected to the second terminals of said first, second, third and fourth capacitors and an output connected to said first monostable multivibrator;
- a five volt source having an output; and
- a resistor having a first terminal connected to the output of said five volt source and a second terminal connected to the output of said operational amplifier.

13. The electronics circuit of claim 7 wherein said first clock signal has a frequency of 25.6 kilohertz.

14. The electronics circuit of claim 7 wherein said phase one clock signal has a frequency of 25.6 kilohertz, said phase two clock signal has a frequency of 25.6 kilohertz, said phase three clock signal has a frequency of 25.6 kilohertz, said phase four clock signal has a frequency of 25.6 kilohertz and said phase five clock signal has a frequency of 25.6 kilohertz.

* * * * *